United States Patent [19]

Inagoya et al.

[11] Patent Number: 4,866,555
[45] Date of Patent: Sep. 12, 1989

[54] MAGNETIC HEAD

[75] Inventors: Osamu Inagoya; Hideo Fujiwara, both of Ibaraki, Japan

[73] Assignee: Hitachi Maxell, Ltd., Osaka, Japan

[21] Appl. No.: 116,345

[22] Filed: Nov. 4, 1987

[30] Foreign Application Priority Data

Nov. 7, 1986 [JP] Japan .................................. 61-263935

[51] Int. Cl.⁴ ........................ G11B 5/147; G11B 5/187
[52] U.S. Cl. ..................................... 360/126; 360/122
[58] Field of Search ............... 360/126, 125, 119, 122, 360/123; 29/603

[56] References Cited

U.S. PATENT DOCUMENTS

| 4,517,616 | 5/1985 | Bischoff | 360/126 |
| 4,559,572 | 12/1985 | Kumasaka et al. | 360/119 |
| 4,656,547 | 4/1987 | Kumasaka et al. | 360/126 |
| 4,755,898 | 7/1988 | Higashionji et al. | 360/125 |

FOREIGN PATENT DOCUMENTS

| 53-116809 | 12/1978 | Japan . |  |
| 53-144315 | 12/1978 | Japan | 360/125 |
| 57-03217 | 1/1982 | Japan | 360/125 |
| 58-155513 | 9/1983 | Japan . |  |
| 61-184705 | 8/1986 | Japan . |  |
| 62-244154 | 2/1987 | Japan | 360/125 |

Primary Examiner—John H. Wolff
Assistant Examiner—Matthew J. Bussan
Attorney, Agent, or Firm—Antonelli, Terry & Wands

[57] ABSTRACT

A magnetic head having a first core half body constituted by a first non-magnetic base and a magnetic layer made of a high-permeability magnetic material and formed on the first non-magnetic base, and a second core half body constituted by a second non-magnetic base and a magnetic layer made of a high-permeability magnetic material and formed on the second non-magnetic base. This magnetic head is provided with a track width regulation groove communicating with at least one of recording medium sliding surfaces of the first and second non-magnetic bases, the track width regulation groove being filled with the magnetic layer; and abutting surfaces formed on the sides of the track width regulation groove opposite to each other in the widthwise direction of the track, the abutting surfaces being parallel to the surface of mating one of the first and second core half bodies when the abutting surfaces abut there-against. The first and second core half bodies are connected to each other by at least a portion of the abutting surfaces.

5 Claims, 9 Drawing Sheets

MAGNETIC HEAD

BACKGROUND OF THE INVENTION

1. FIELD OF THE INVENTION

This invention relates to a magnetic head formed of two half cores connected to each other.

2. PRIOR ART

The coercive force of magnetic recording medium has been improved because of the increasing need for high-density magnetic recording. Correspondingly, development is being promoted of a magnetic head which can be adapted to perform recording on such a magnetic recording medium and which is formed, at least at portions facing a magnetic gap, from a magnetic material which enables a high degree of saturation magnetic flux density.

The inventors of the present invention also studied this type of magnetic head from various aspects and proposed a magnetic head which is formed by using a core half body which is constituted by use bases having side surfaces formed on the side of a magnetic gap and inclined relative to the magnetic gap surface, and thin magnetic films that are made of a magnetic material enabling a high degree of magnetic flux density and that cover the side surfaces of the core bases on the side of the magnetic gap (Japanese Patent Unexamined Publication No. 155513/1983).

Other types of heads designed to improve the wear resistance of head cores and reduce sliding noise have been proposed. For example, a head in which core base portions in the recording medium sliding surface are formed from a non-magnetic material (Japanese Patent Unexamined Publication No. 116809/1978) and a head in which a portion between the front surface and a winding window is formed from a non-magnetic material and in which a back core is formed of high-permeability cores (Japanese Patent Unexamined Publication No. 184705/1986) are known.

FIG. 15 shows a perspective view of the above-described type of magnetic head having non-magnetic bases 1a and 1b, magnetic layers 2a and 2b formed from a high permeability magnetic material, glass 3, a head gap 4, and a winding window 5.

A method of producing this magnetic head will be described below with reference to FIGS. 16 to 22.

Referring to FIG. 16, a pair of grooves 14 are formed in one surface of a ferrite block 1 from which the core half body 1a or 1b is formed. The grooves 14 are formed in such a manner that they are parallel with and close to each other. A thread of a projection 15 having an acute tip (apex) is formed in each groove 14. Next, a thin magnetic film 2 made of a high-permeability magnetic material capable of enabling a high degree of saturation magnetic flux density is formed uniformly by a thin film forming technique such as vapor deposition or sputtering on the surface in which the grooves 14 and projections 15 are formed (refer to FIG. 17).

As shown in FIG. 18, a reinforcement layer 16 made of a non-magnetic material such as glass is formed on the thin magnetic film 2 with a comparatively substantial thickness, and these members are polished to a level indicated by the chain line in FIG. 18. FIGS. 19 and 20 show a resultant structure in which the thin magnetic film 2 is partially removed by polishing above the tips of the projections 15 so that it has flat portions 17.

The block thus formed is partially cut to a predetermined depth so as to form a coil groove 18 which extends in the direction perpendicular to the threads of projections 15, as shown in FIG. 21, thereby obtaining a core half body 1a. The core half body 1a in which the coil groove 18 is formed and a block having no coil groove 18 (Refer to FIG. 20; this block serves as the core half body 1b.) are integrally connected to each other by glass bonding so that glass portions 5 face each other, as shown in FIG. 22. The blocks thus connected are sliced along planes indicated by the chain lines in FIG. 22, thereby obtaining a magnetic head such as that shown in FIG. 15.

However, in the above-described type of magnetic head, a large amount of glass is used to connect the two core half bodies and, therefore, in the process of setting and cooling the glass after melting, a large degree of residual thermal stress occurs in the glass 3 due to the very small difference between the thermal expansion rates of the magnetic layers 2a and 2b of a high saturation magnetic flux density and the glass 3. This stress can cause the magnetic layers 2a and 2b to come off and the glass 3 to be cracked, resulting in a considerable lowering of the productivity of the magnetic head manufacturing process.

In addition, the glass 3 tends to wear at a higher rate compared with the non-magnetic bases 1a and 1b and the magnetic layers 2a and 2b since, as is clear from FIG. 15, the glass 3 is exposed in the recording medium sliding surface, and since the hardness of the glass 3 is lower than that of the non-magnetic bases 1a and 1b and the magnetic layers 2 and 2b compared with the non-magnetic bases 1a and 1b and the magnetic layers 2a and 2b. Thus, there is a possibility of the formation of step portions in the recording medium sliding surface, which would cause deteriorations in the performance of the magnetic recording medium.

SUMMARY OF THE INVENTION

It is therefore an object of the present invention to provide a magnetic head free from the above-described problems and which is improved in terms of the productivity and influence on the performance of the magnetic recording medium.

To this end, the present invention provides a magnetic recording head having a structure in which a track width regulation groove formed in a non-magnetic base which constitutes at least one of the first and second core half bodies and in which a magnetic layer made of a high-permeability magnetic material is embedded in the track regulation groove. This structure enables the amount of glass used to connect the core half bodies to be minimized. Also, this magnetic head is constructed so as to reduce the magnetic reluctance of the magnetic layer at the winding window formed in at least one of the first and second core half bodies, thereby enabling a magnetic flux-constructing effect with respect to the magnetic flux in the gap formed at the track width regulation groove.

BRIEF DESCRIPTION OF THE DRAWINGS

The present invention will be better understood from the detailed description given hereinbelow and the accompanying drawings which are given by way of illustration only, and thus are not limitations of the present invention and wherein.

DESCRIPTION OF THE PREFERRED EMBODIMENTS

Preferred embodiments of the present invention will be described below with reference to the accompanying drawings.

Figure 1:
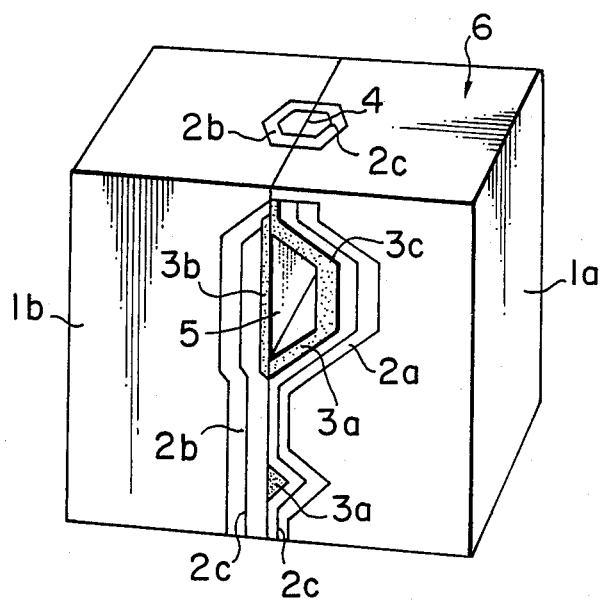
FIG. 1 is a perspective view of a magnetic head which is an embodiment of the present invention.

FIG. 1 shows a perspective view of a magnetic head which represents an embodiment of the present invention and which is provided with non-magnetic bases $1a$ and $1b$, magnetic layers $2a$ and $2b$, glass portions $3a$ and $3b$, a protective film $3c$, a head gap 4, a winding window 5, and a sliding surface 6 over which a magnetic recording medium slides.

The structure shown in FIG. 1 has core half bodies which are made of a gap regulation material such as $SiO_2$ and which are disposed on opposite sides of a plane which contains the head gap 4. These core half bodies are connected to each other by the glass portions $3a$ and $3b$. The magnetic layers $2a$ and $2b$ which are made of a magnetic material having a high permeability and capable of enabling a high degree of saturation magnetic flux density are formed on the surfaces cf the core half bodies that face each other, each of the magnetic layers $2a$, $2b$ having a multilayer structure including at least one non-magnetic intermediate layer $2c$. The magnetic layers $2a$ and $2b$ are separated from each other at the winding window 5 by a groove formed in one of the core half bodies, are close to each other in a front portion of the head on the side of the recording medium sliding surface 6, and are partially exposed at their ends in the recording medium sliding surface, thereby forming the head gap 4 filled with a gap material (not shown). The magnetic layers $2a$ and $2b$ are also close to each other in a rear portion of the head on the side remote from the recording medium sliding surface 6 relative to the winding window 5 (slightly separated from each other by the thickness of the gap material). Magnetic paths are thus formed in the head.

The glass portions $3a$ and $3b$ are formed on the magnetic layers $2a$ and $2b$ formed around the winding window 5 between the core half bodies and on a magnetic layer formed in a groove in a rear portion of one of the core half body. Protective films having the non-corrodible protective film $3c$ (e.g., films made of chromium) are interposed between these glass portions and magnetic layers. The pair of core half bodies are connected to each other by bonding together the glass portions $3a$ and $3b$ around the winding window 5 and bonding the glass portion $3a$ and the magnetic layer $2b$ at the rear portion.

In accordance with this embodiment as described above, the amount of glass used to connect the pair of core half bodies can be greatly reduced, when compared with a conventional magnetic head, and, therefore, the residual thermal stresses which occur in the glass when the core half bodies are connected to each other is reduced, thereby eliminating the occurrence of cracks or the like in the non-magnetic bases $1a$ and $1b$ and the glass portions $3a$ and $3b$, and thus improving the productivity.

The bonding glass is provided within the head tip on its internal side relative to the recording medium sliding surface 6, such as around the winding window 5, and the magnetic layers $2a$ and $2b$ in the structure formed on the recording medium sliding surface 6 are directly embedded in the non-magnetic bases $1a$ and $1b$ so that no bonding glass is exposed. Therefore, there is no possibility that stepped portions will be created in the recording medium sliding surface 6 by the sliding of a magnetic recording medium thereon.

A method of manufacturing the head in accordance with this embodiment will now be described below with reference to FIGS. 3 to 6.

Figure 3:
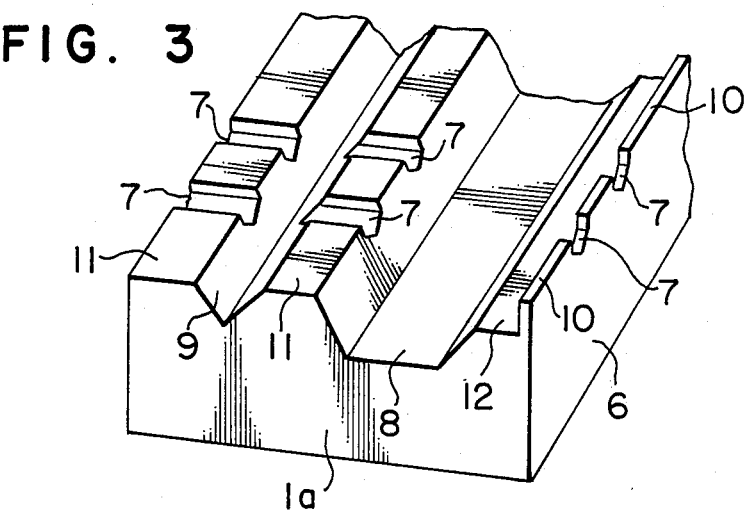
FIGS. 3 to 6 are illustrations of the process in which one of the core half bodies shown in FIG. 1 is manufactured.

As shown in FIG. 3, the non-magnetic base $1a$ is worked so as to form at regular intervals a plurality of grooves 7, each having a width corresponding to the width of tracks (10 to 200 μm) and having a V-shaped bottom. The boundary between the magnetic layer $2a$ and the non-magnetic base $1a$ facing the 4 at the recording medium sliding surface is thereby made non-parallel to the head gap 4, as shown in FIG. 1, thereby preventing the occurrence of a pseudo gap at this boundary.

Next, as shown in FIG. 3, grooves 8 and 9 are formed so that they extend in the direction perpendicular to the grooves 7. The groove 8 serves as the winding window 5 (FIG. 1), and the groove 9 is used to accommodate the glass portion $3a$ in the rear portion shown in FIG. 1. The grooves 8 and 9 are formed so as to be deeper than the grooves 7. A step portion 12, which is deeper than the grooves but shallower than the groove 8, is formed between the groove 8 and the recording medium sliding surface 6. Therefore, surfaces 10 are formed between the recording medium sliding surface 6 and the step portion 12 by leaving corresponding portions of the non-magnetic base $1a$ near to the non-magnetic surface 6 unworked, and the width of the surface 10 is set to a dimension determined by adding a working margin to the necessary gap depth.

The surface of the non-magnetic base $1a$ is also cut on the opposite sides of the groove 9 to a depth less than that of the grooves 7, thereby forming surfaces 11 which are recessed relative to the surface 10.

Examples of the material of the non-magnetic base $1a$ are non-magnetic ferrites, ceramics, and crystallized glasses.

Figure 4:
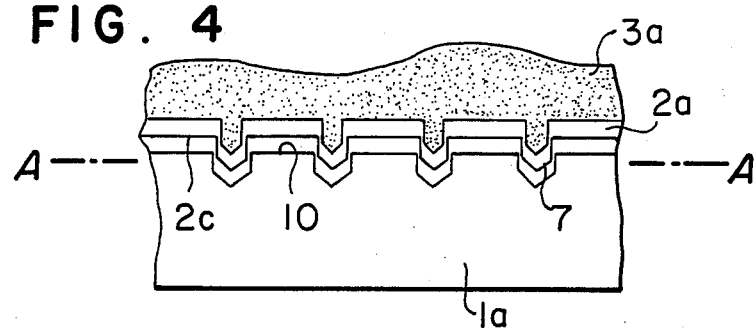
Figure 5:
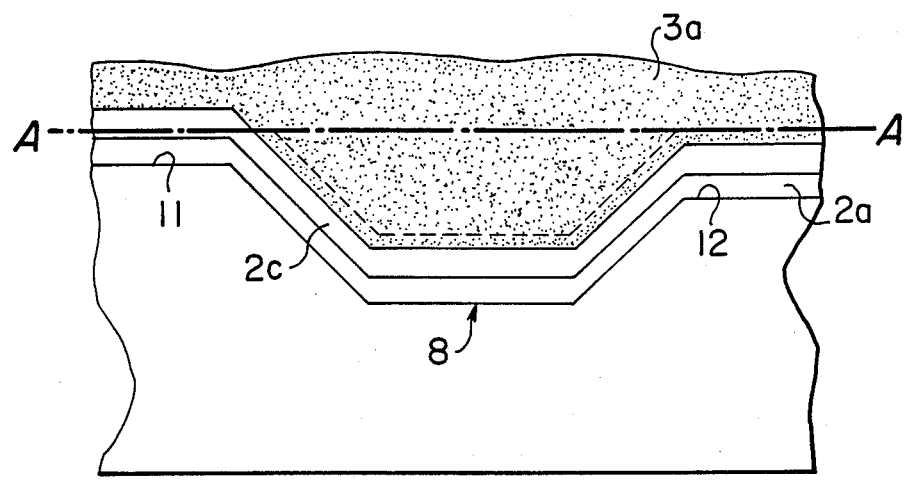

Next, a magnetic layer having a high permeability is formed by physical vapor deposition such as sputtering or by plating on the surface of the thus formed non-magnetic base $1a$ to a thickness approximately equal to the depth of the grooves 7, and this layer is covered with glass. FIG. 4 is an illustration of a resultant structure as viewed from the side of the recording medium sliding surface 6. FIG. 5 is another illustration of this structure as viewed in the direction in which the grooves 8 and 9 extend.

A crystalline alloy or non-crystalline alloy is used to form the magnetic layer 2a. Examples of the crystalline alloy are, iron-aluminum-silicon alloys, iron-silicon alloys and iron-nickel alloys. Examples of the non-crystalline alloy are alloys consisting of at least one element selected from a group of iron, nickel and cobalt and at least one element selected from a group of phosphorous, carbon, boron and silicon, alloys containing these combinations of elements as main components and other additional elements such as aluminum, germanium, beryllium, stannum, molybdenum, indium, tungsten, titanium, manganese, chrome, zirconium, hafnium and niobium, and alloys having main components of cobalt and zirconium and other components of the above additional elements.

Figure 2:
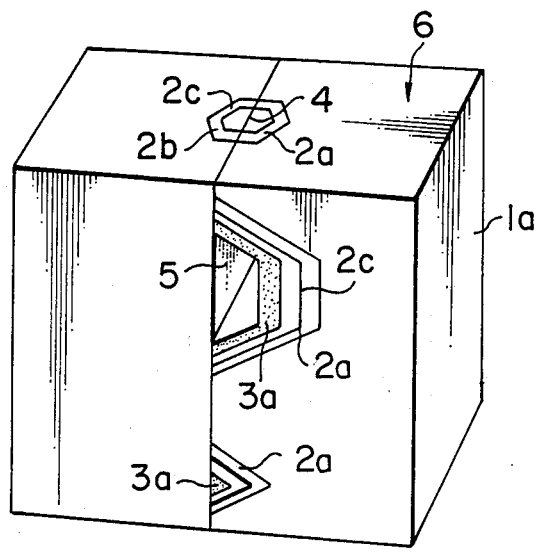
FIG. 2 is a perspective view of a magnetic head which represents another embodiment of the present invention.
Figure 2A:
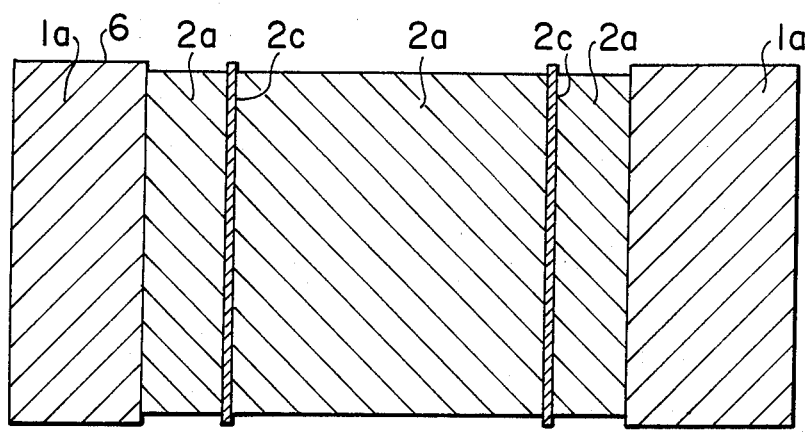
FIG. 2A is an illustration of a head tip in transverse section.

To reduce eddy current losses, the magnetic layer 2a is provided with a multilayer structure including a non-magnetic intermediate layer 2c (made of, e.g., $SiO_2$) (refer to FIG. 2A).

Next, as shown in FIGS. 4 and 5, the thus formed layer covered with glass is polished on the side of the glass 3a to a level indicated by the chain line A—A, and the glass 3a is ground in the groove 8 as indicated by the broken line so that a slight amount of glass is left in the groove, thereby forming the winding window.

Figure 6:
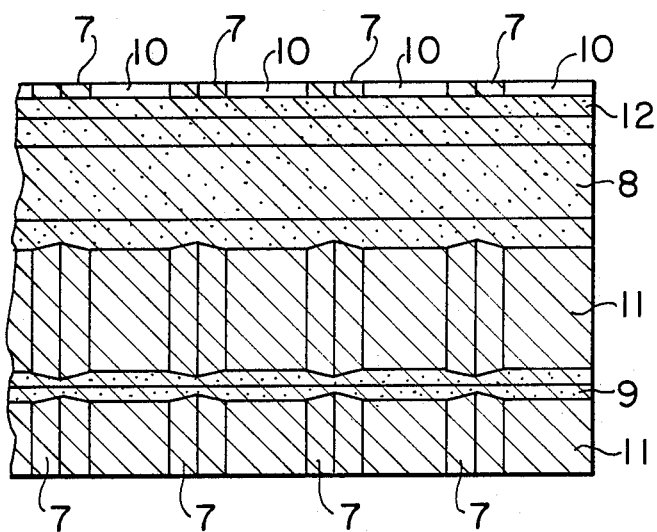

One of the core half bodies is thus formed. FIG. 6 shows the upper surface of this core half body. In FIG. 6, the area in which the magnetic layer 2a is formed is indicated by hatching except for the surfaces 10, and the areas in which the glass 3a is provided is indicated by hatching and dots. The magnetic layer 2a is exposed at the positions of the grooves 7 and the surfaces 11.

A method of manufacturing the other core half body will be described below with reference to FIGS. 7 to 9.

Figure 7:
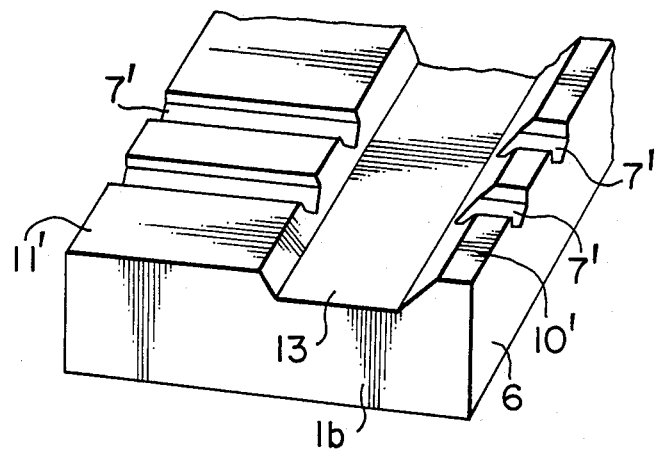
FIGS. 7 to 9 are illustrations of part of the process in which the other core half body shown in FIG. 1 is manufactured.

Referring to FIG. 7, the non-magnetic base 1b, that is made of the same material as the non-magnetic base 1a shown in FIG. 3, is worked in the same manner as that shown in FIGS. 3. Grooves 7' are thereby formed in the base at regular intervals and a groove 13 is formed so that it is perpendicular to the grooves 7' and faces the groove 8 shown in FIG. 3. The groove 13 is slightly deeper than the grooves 7', and a surface 11' which is remote from a surface 10' on the side of the recording medium sliding surface 6 relative to the groove 13 is higher than the bottoms of the grooves 7'.

A magnetic layer is formed from the same material and in the same manner as the magnetic layer 2a shown in FIG. 4 so that the grooves 7' are filled with this layer. The magnetic layer thus formed is covered with glass. FIG. 8 is an illustration of a resultant structure as viewed from the side of the groove 13.

Figure 8:
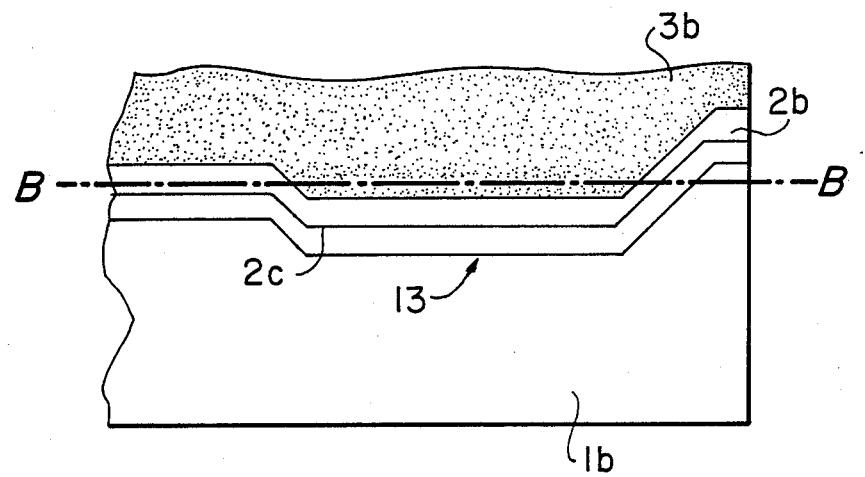
Figure 9:
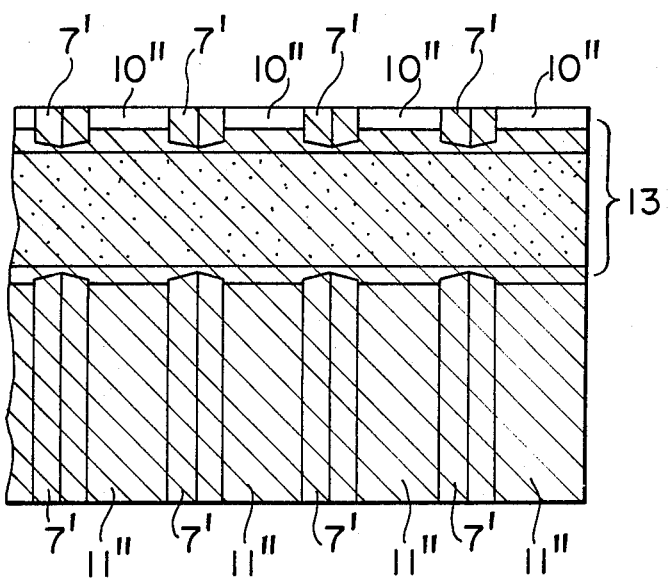

Next, as shown in FIG. 8, the thus formed layer covered with glass is polished on the side of the glass 3b to a level indicated by the chain line B—B, thereby obtaining the other core half body. FIG. 9 shows the upper surface of this core half body. In FIG. 9, the area in which the magnetic layer 2b is formed is indicated by hatching which is applied except for surfaces 10" (formed by polishing the surface 10' as shown in FIG. 8), and the area on the magnetic layer 2b in which the glass 3b is provided is indicated by hatching and dots (corresponding to the groove 13). The magnetic layer 2b is exposed at positions other than those of the surfaces 10" and the groove 13.

The thus formed core half bodies are connected to each other by thermocompression bonding after they have been superposed on each other with a gap sheet of a predetermined thickness interposed therebetween so that the grooves 7 and 7' face each other. The core half bodies thereby connected is cut at positions between adjacent grooves 7 (7'), thereby obtaining a magnetic head such as that shown in FIG. 1.

In accordance with the embodiment, the magnetic layers of the two core half bodies are connected to each other on surfaces of a rear portion of the head having large areas, thereby greatly reducing the magnetic reluctance of each magnetic path and enabling an improved efficiency of recording or reproduction.

In the above-described embodiment, it is not always necessary to provide the glass 3b on the non-magnetic base 1b. The reason for the provision of the step portion 12 shown in FIG. 3 is that a desired head depth can be obtained by interposing glass between portions of the magnetic layers 2a and 2b formed between the winding window 5 and the recording medium sliding surface 6 so as to sufficiently increase the distance between these layers. If it is possible to obtain a desired gap depth by the formation of the groove 8 shown in FIG. 3, the provision of the step portion 12 is not necessary.

However, it is not necessary to greatly increase the area of the surfaces on which the two core half bodies are connected to each other in the rear portion, though the magnetic reluctance is not reduced unless this area is increased. FIG. 2 shows, in relation to this, a perspective view of a magnetic head which represents another embodiment of the present invention. In FIG. 2, portions corresponding to those shown in FIG. 1 are indicated by the same reference symbols.

This embodiment is characterized in that the connection of the core half bodies in a rear portion of the magnetic head is effected by magnetic layers which fill grooves and appear as magnetic surfaces 2a and 2b in the recording medium sliding surface 6.

Figure 10:
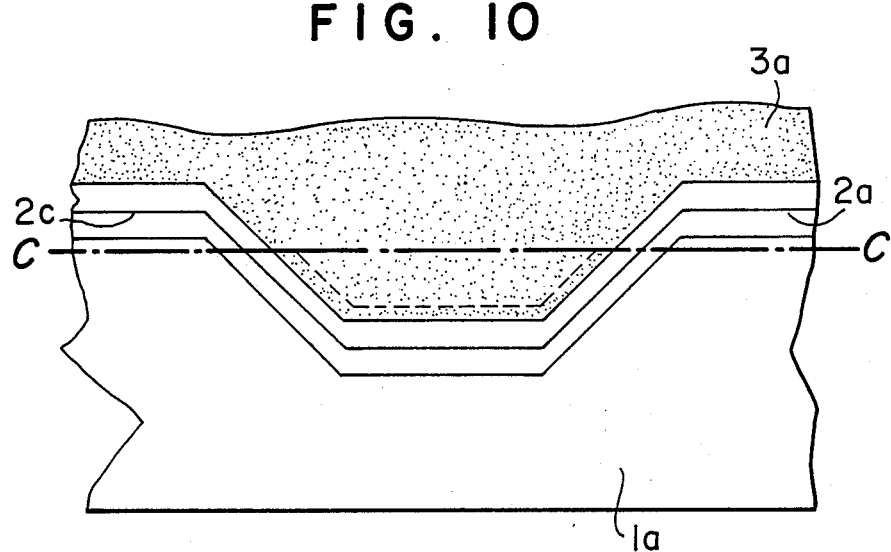
FIGS. 10 to 11 part of the process in which one of the core half bodies shown in FIG. 2 is manufactured.

In a manufacture process in accordance with this embodiment which is basically the same as that in accordance with the embodiment shown in FIG. 1, there is no need for the step of forming a step portion 12 such as that shown in FIG. 3, surfaces 11 and 10 are formed in such a manner that they are contained in one and the same plane, and there is no need for the step of polishing the surfaces 11. In this process, a step of polishing the core half bodies is performed instead of the step shown in FIG. 5 so that the non-magnetic base 1a is partially removed to a level indicated by the chain line in FIG. 10. The glass is thereafter ground so as to form a window through which a winding is formed.

Figure 11:
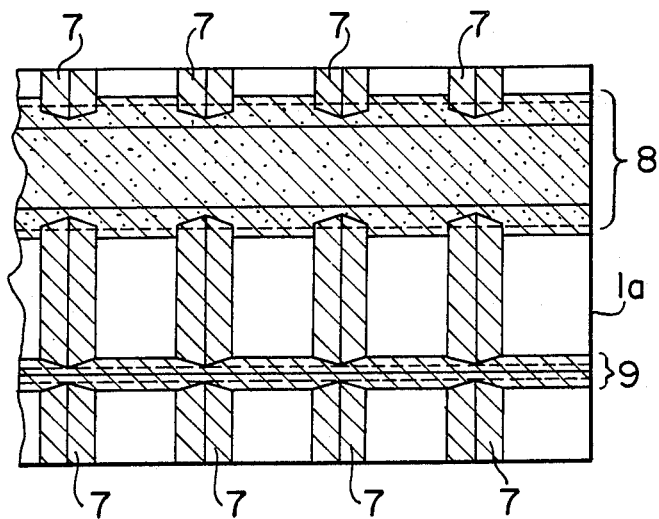
Figure 12:
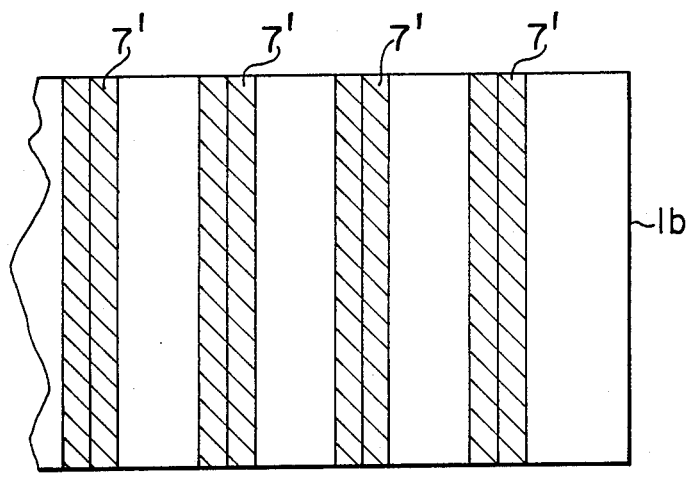
FIG. 12 is an illustration of part of the process in which the other core half body shown in FIG. 2 is manufactured.

FIG. 11 shows the upper surface of one of the core half bodies formed in this manner. Similarly, FIG. 12 shows the upper surface of the other core half body. In FIGS. 11 and 12, the area in which the magnetic layers 2a and 2b are formed is indicated by hatching. In FIG. 11, a dotted and hatched portion indicates the area in which glass is provided. The thus formed core half bodies are integrally connected to each other by thermocompression bonding after they have been superposed on each other with a gap sheet interposed therebetween so that the grooves 7 and 7' face each other. The core half bodies thereby connected is cut at positions between adjacent grooves 7 (7'), thereby obtaining a magnetic head such as that shown in FIG. 2.

As a result, in this embodiment, magnetic layers formed in the grooves 7 and 7' form magnetic paths which have smaller sectional areas and greater magnetic reluctances compared with the embodiment shown in FIG. 1, but this structure also enables comparatively good recording or reproduction.

Another method of setting the gap depth will be described below with reference to FIGS. 13 and 14.

Figure 13A:
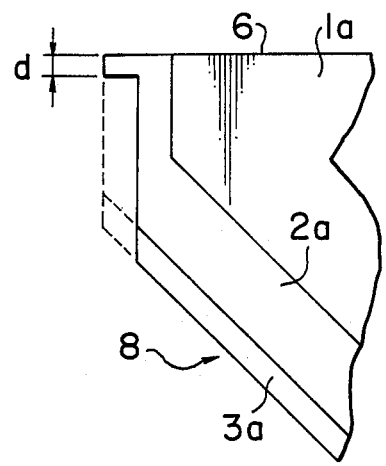
FIG. 13 is an illustration of an example of the method of setting the gap depth of the magnetic head in accordance with the present invention.
Figure 13B:
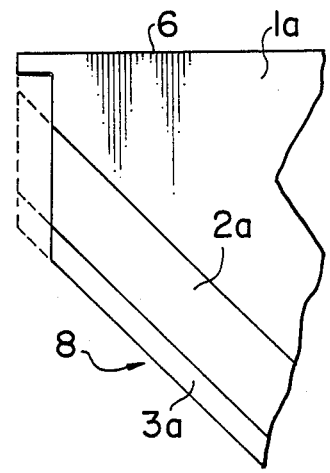

FIG. 13A is a cross-sectional view of the core half body shown in FIG. 11, which is perpendicular to the plane of FIG. 11 and taken along a line which extends in one of the grooves 7 in parallel thereto, and FIG. 13B is a cross-sectional view parallel to FIG. 13A and taken at a position other than the positions of the grooves 7. In the embodiment shown in FIG. 2, the gap depth can be set by changing the position of the groove 8 because the groove 8 includes a portion on the front side indicated by the broken line in FIG. 13A. However, the method described hereinbelow sets the gap depth in the following manner. In the process (FIG. 10) in which glass is removed at the position of the groove after the glass has been formed on the magnetic layer 2a by the abovedescribed manufacture method, the magnetic layers are ground to a predetermined depth on the front side of the groove 8, as indicated by the broken line, while leaving a portion having a thickness d from the recording medium sliding surface 6. This thickness coincides with a dimension determined by adding a working margin to the gap depth d.

Figure 14:
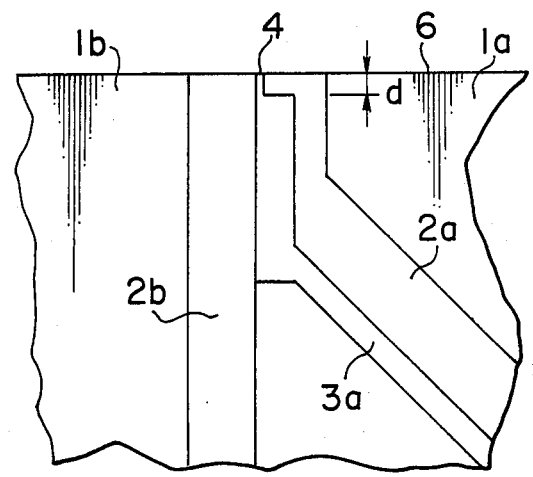
FIG. 14 is a cross-sectional view of a portion of the magnetic head in the vicinity of the head gap in accordance with the setting shown in FIG. 13.
Figure 15:
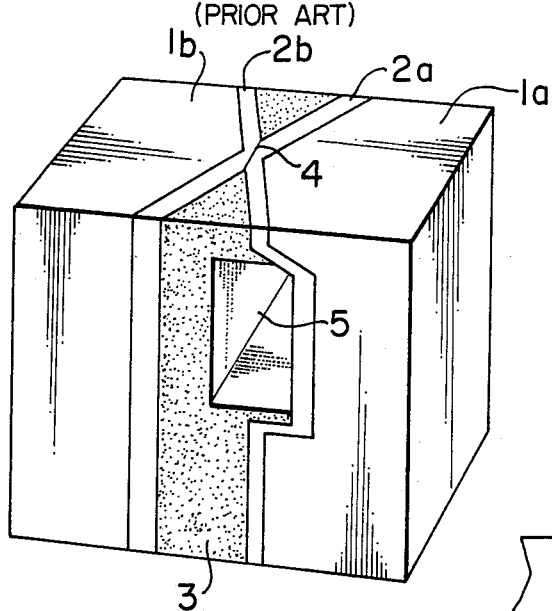
FIG. 15 ia a perspective view of a conventional magnetic head.
Figure 16:
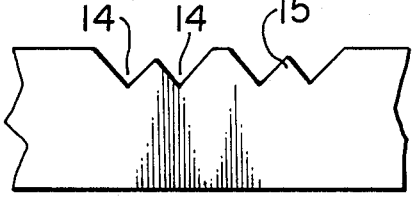
FIGS. 16 to 22 are illustration s of the process in which the conventional magnetic head shown in FIG. 15 is manufactured.
Figure 17:
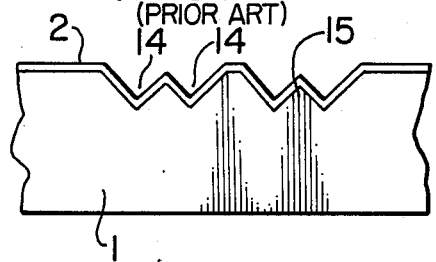
Figure 18:
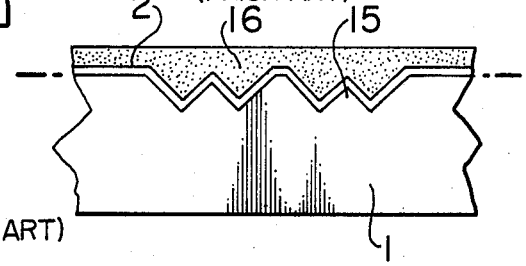
Figure 19:
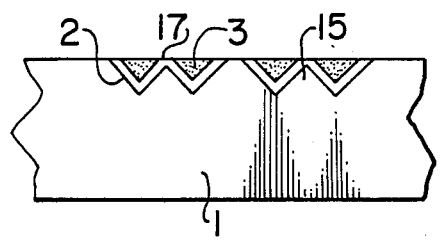
Figure 20:
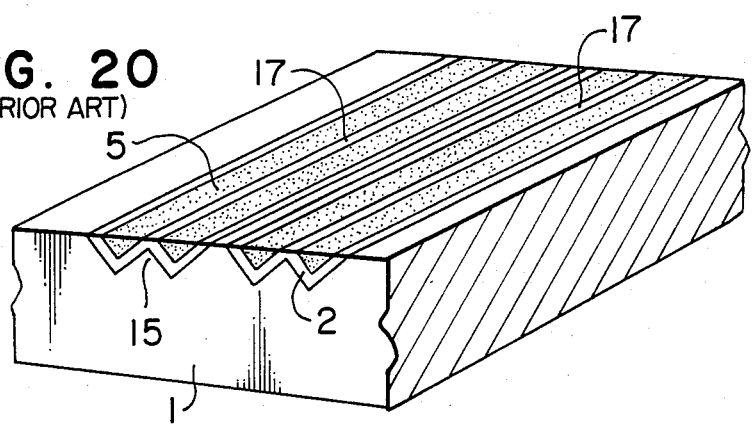
Figure 21:
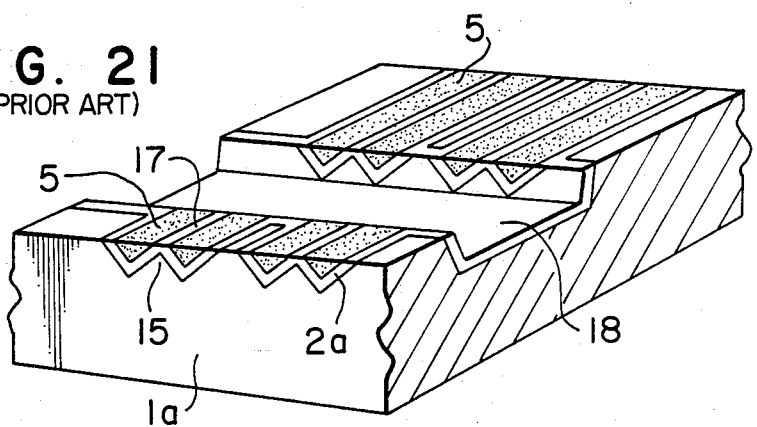
Figure 22:
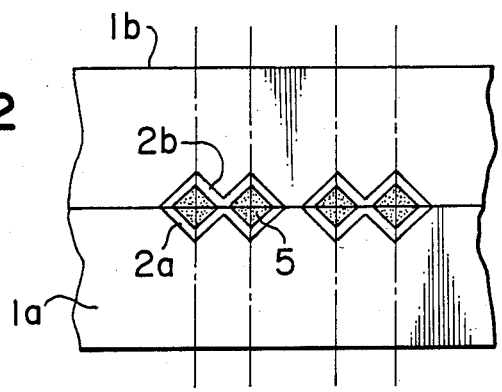

This ground portion is thereafter also filled with a gap material, and the core half body 1a thus formed is thereafter connected to the other core half body, thereby obtaining a magnetic head having a dimension which is the sum of the predetermined gap depth d and the working margin, as shown in FIG. 14, Next explanation will be made to the process of polishing the recording medium sliding surface 6 from which the tip ends of the intermediate layers 2c embedded in the magnetic layers 2a and 2b are projected in the part of the head chip as shown in FIG. 2a. These intermediate layers 2c are adapted to restrain eddy current loss in the magnetic layers 2a and 2b, thereby it is possible to prevent the magnetic permeability and recording and reproducing characteristics of the magnetic head from being deteriorated.

It is noted that the thickness of the intermediate layer is in a range of several tens to several thousands Å while the drawability of material of the magnetic layer is high. Accordingly, the material of the magnetic layer is liable to hang over the tip of the intermediate layer exposed from the recording medium sliding surface of the magnetic head during polishing of the latter. Accordingly, it is suitable to project the tip end of the intermediate layer slightly from the recording medium sliding surface of the magnetic head in order to prevent the material of the magnetic layer from hanging over the tip end of the intermediate layer.

The intermediate layer may be made to project from the end surface of the magnetic layer 2a by using a method of performing mirror polishing on cut-end surfaces of a metal magnetic member of a magnetic head or by chemical etching or sputter-etching.

If projecting portions of the intermediate layers 2c which project from the levels of the end surfaces of the magnetic layers 2a and 2b corresponding to opposite surfaces of the magnetic head other than the recording medium sliding surface 6 are formed by using a mirror polishing method, it is necessary for the intermediate layers 2c to be difficult to polish compared with the magnetic layers 2a and 2b. In general, there is a correlation between the wear resistance and the hardness, and a material having a greater hardness exhibits a greater resistance to wear. Therefore, if a non-magnetic material having a hardness greater than that of the magnetic layers 2a and 2b is used to form the intermediate layers 2c, the rate at which the intermediate layers 2c wear becomes smaller than that at which the magnetic layers 2a and 2c wear, so that the intermediate layers 2c can project from the end surfaces of the magnetic layers 2a and 2b. Preferably, the roughness of the surface finished by mirror polishing is set to be on the order of 0.05 $\mu$m or finer when the extent to which the intermediate layers 2c are made by mirror polishing to project from the opposite surfaces of the magnetic head is adjusted. If the surface roughness after mirror polishing is above the order of 0.05 $\mu$m, the reproduction output decreases.

If the projecting portions are formed by a certain means such as chemical etching or sputter-etching, it is specifically effective to apply such a means to the recording surface sliding surface. The work in accordance with a method using such a means can also be facilitated by previously projecting the intermediate layers 2c. Therefore, it is preferable to set the hardness of the intermediate layer 2c to be higher than that of the magnetic layers 2a and 2b.

Specifically, a Vickers hardness of the intermediate layers 2a of higher than 200 is preferred in accordance with the method of using mirror polishing, chemical etching, sputter-etching, or the like, since cobalt amorphous alloys have Vickers hardnesses (Hv) of 600 to 800, permalloys Hv 120 to 200, and Sendusts Hv 500 or so, which may be used to form the magnetic layers 2a and 2b of the magnetic head.

If the intermediate layers 2c project excessively from the end surfaces of the magnetic layers 2a and 2c at the position of recording medium sliding surface after chemical etching, sputter-etching, or the like (FIG. 2c), there is a possibility of reduction in the degree of contact between the magnetic head and the magnetic recording medium along with a possibility of the recording medium being scratched, resulting in a state in which information cannot be recorded on or reproduced from some portions of the recording medium. In this respect, it is preferable to set the height of projections of the intermediate layers 2c on the sliding surface to 0.01 to 0.05 $\mu$m.

Two magnetic layers having a thickness of 25 $\mu$m and an intermediate layer having a thickness of 0.1 $\mu$m were formed by sputtering on one surface of a base formed from Mn-Zn ferrite or Zn ferrite. The core bases formed in this manner were integrally connected to each other with a magnetic gap formed from a non-magnetic material interposed therebetween, and the connection thereof was reinforced by a glass layer. A Co-Ta-Zr amorphous alloy containing cobalt as a main component and having was used to form the magnetic layers, and the Vickers hardness of these layers was about 700. $SiO_2$ was used to form the intermediate layers, and the Vickers hardness of these layers was about 1200.

A portion of a block thus constructed on which the recording medium sliding surface was to be formed was coated with an organic resin or the like, and the block was thereafter cut. The block which is used to form the magnetic head was then dipped in a chemical etching liquid containing a strong acid (HCl) as a main component so as to dissolve portions of the magnetic layers corresponding to at the opposite surfaces and the bottom of the head, thereby making the intermediate layers project from the end surfaces of the magnetic layers. The organic resin on the recording medium sliding surface was thereafter dissolved by using an organic solvent. The recording medium sliding surface was thereafter lapped so that the intermediate surfaces project from the end surfaces of the magnetic layers to an extent ranging from 0.01 to 0.05 $\mu$m.

The present invention has been described by way of example with respect to the preferred embodiments, but the present invention is not limited to these embodiments.

For example, the two core half bodies, which are, in the above-described embodiments, connected to each other over the entire areas of their surfaces facing each other, may be connected at their rear end portions only.

In accordance with the present invention, as described above, the glass that connects the two core half bodies is provided on some portions of the surfaces of the core half bodies that face each other, thereby enabling a reduction in the amount of glass used and, hence, in the residual thermal stress occurring when the core half bodies are connected to each other. It is therefore possible to prevent the magnetic layers from coming off and the glass or the non-magnetic bodies from being cracked and thereby improve the productivity remarkably. Moreover, the bonding glass is not exposed in the surface over which the recording medium slides, and there is no possibility of the formation of stepped portions in the recording medium sliding surface caused by the sliding of the recording medium.

What is claimed is:

1. A magnetic head having a recording medium sliding surface, comprising:
   a first core half body composed of a first non-magnetic base having a top surface and a side surface, and a magnetic layer made of a high permeability magnetic material and formed on said side surface of said first non-magnetic base;
   a second core half body composed of a second non-magnetic base having a top surface and a side surface, and a second magnetic layer made of a high permeability magnetic material and formed on said side surface of said second non-magnetic base, said top surfaces of said first and second non-magnetic bases forming said recording medium sliding surface of said magnetic head when said first and second core halves are mated together between said side surface of said first and second non-magnetic bases through said first and second magnetic layers;
   a track width regulation groove formed in at least one of said surfaces of said first and second non-magnetic bases and opened at said recording medium sliding surface and filled with an associated magnetic layer, and
   bonding means disposed between said side surfaces of said first and second non-magnetic bases below said recording medium sliding surface for effecting bonding between said side surfaces of said first and second non-magnetic bases.

2. A magnetic head according to claim 1, wherein a winding window recess having an internal surface is formed in said side surface of at least one of said first and second core half bodies, and wherein said associated magnetic layer is formed over the entire area of the internal surface of said winding window recess.

3. A magnetic head according to claim 2, wherein said side surface of one of said first and second non-magnetic bases in which no winding window recess is formed has a portion confronting said winding window recess, said portion being formed thereon with said associated magnetic layer.

4. A magnetic head according to claim 1, wherein said first core half body has a winding window recess, and wherein a recess is formed in a portion of said second non-magnetic base of said second core half body facing said winding window formed in said first core half body.

5. A magnetic head according to claim 4, wherein a protective layer for protecting said magnetic layer formed at least on a portion of said first core half body forming said winding window is interposed between said magnetic layer of said first core half body and said bonding means including bonding glass for connecting said first and second core half bodies to each other.

* * * * *